March 21, 1933.  C. W. PARKER  1,902,291

APPARATUS FOR DELIVERING LIGHTED CIGARETTES AND CIGARS

Filed June 30, 1927  8 Sheets-Sheet 1

March 21, 1933. C. W. PARKER 1,902,291
APPARATUS FOR DELIVERING LIGHTED CIGARETTES AND CIGARS
Filed June 30, 1927 8 Sheets-Sheet 2
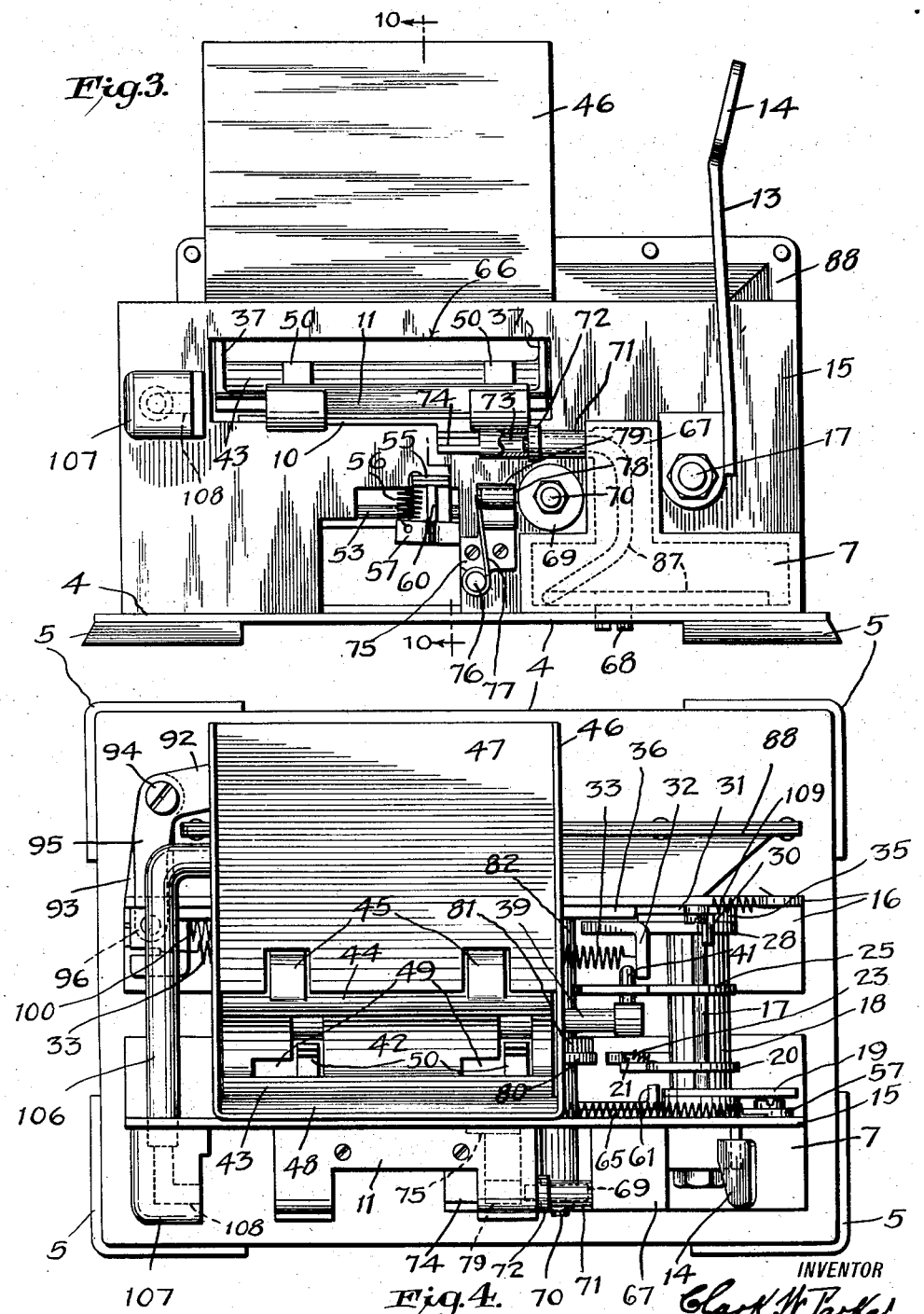
INVENTOR
Clark W. Parker
BY
Chas. M. C. Chapman
ATTORNEY March 21, 1933.   C. W. PARKER   1,902,291
APPARATUS FOR DELIVERING LIGHTED CIGARETTES AND CIGARS
Filed June 30, 1927   8 Sheets-Sheet 3

INVENTOR
Clark W. Parker
BY
Fred Mc C. Chapman
ATTORNEY

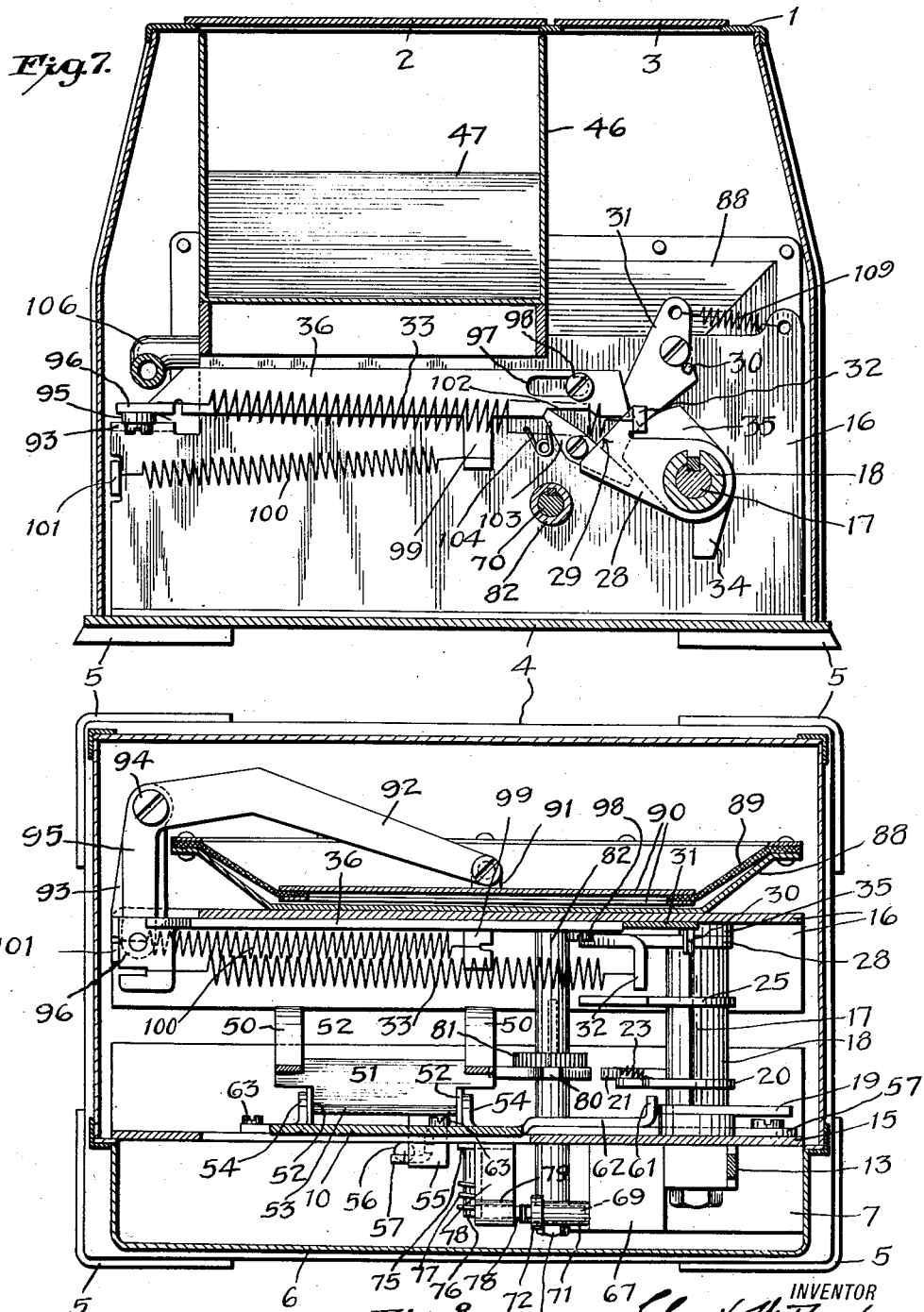

March 21, 1933.  C. W. PARKER  1,902,291
APPARATUS FOR DELIVERING LIGHTED CIGARETTES AND CIGARS
Filed June 30, 1927  8 Sheets-Sheet 5

INVENTOR:
Clark W. Parker
BY
Chas. M. McC. Chapman
ATTORNEY

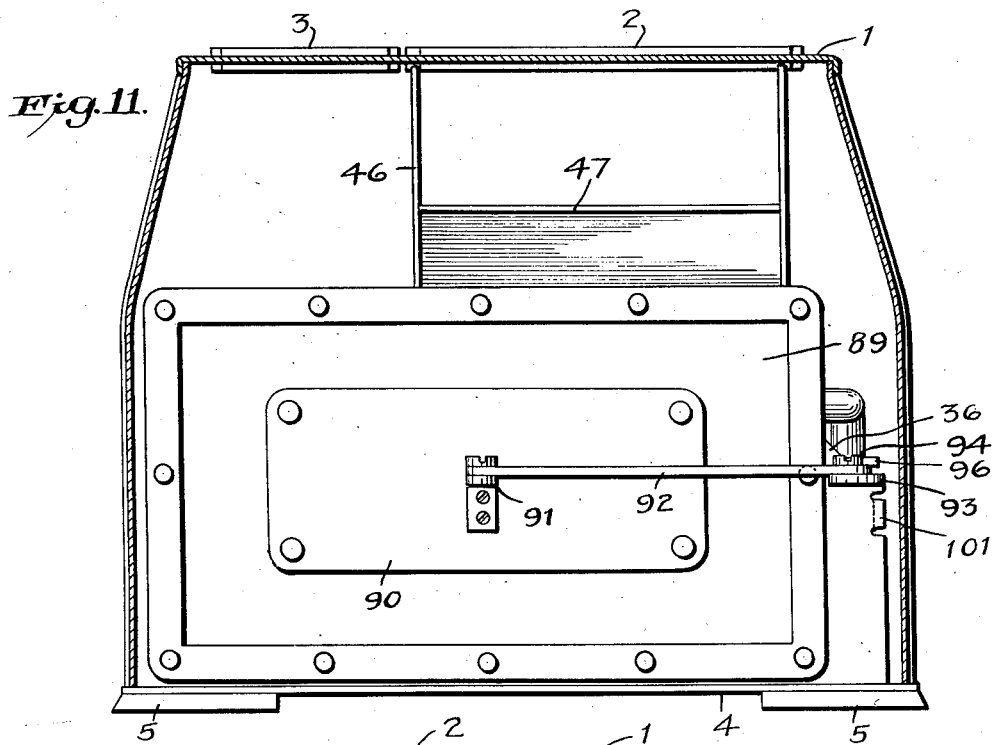
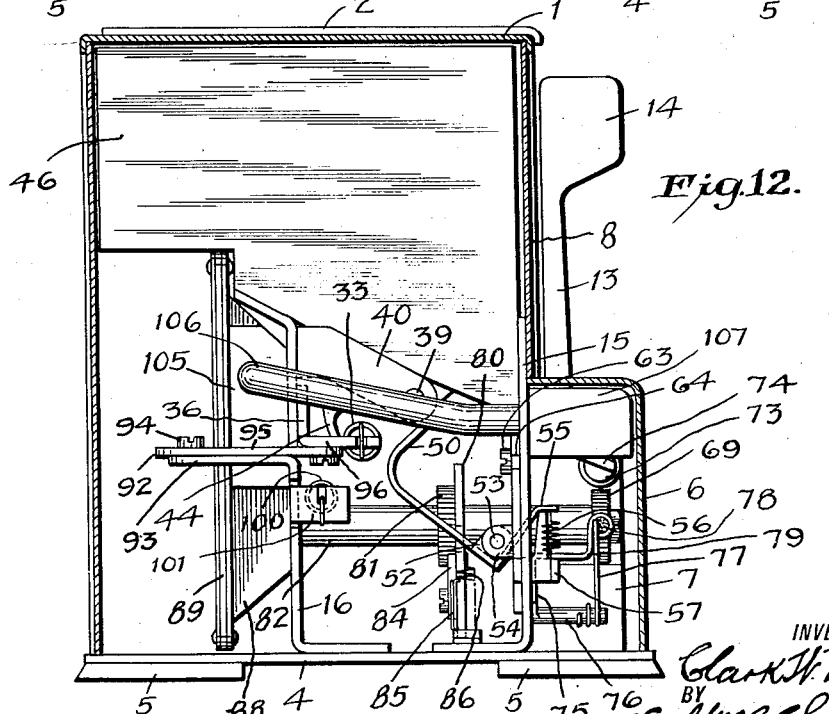

March 21, 1933.  C. W. PARKER  1,902,291
APPARATUS FOR DELIVERING LIGHTED CIGARETTES AND CIGARS
Filed June 30, 1927  8 Sheets-Sheet 7
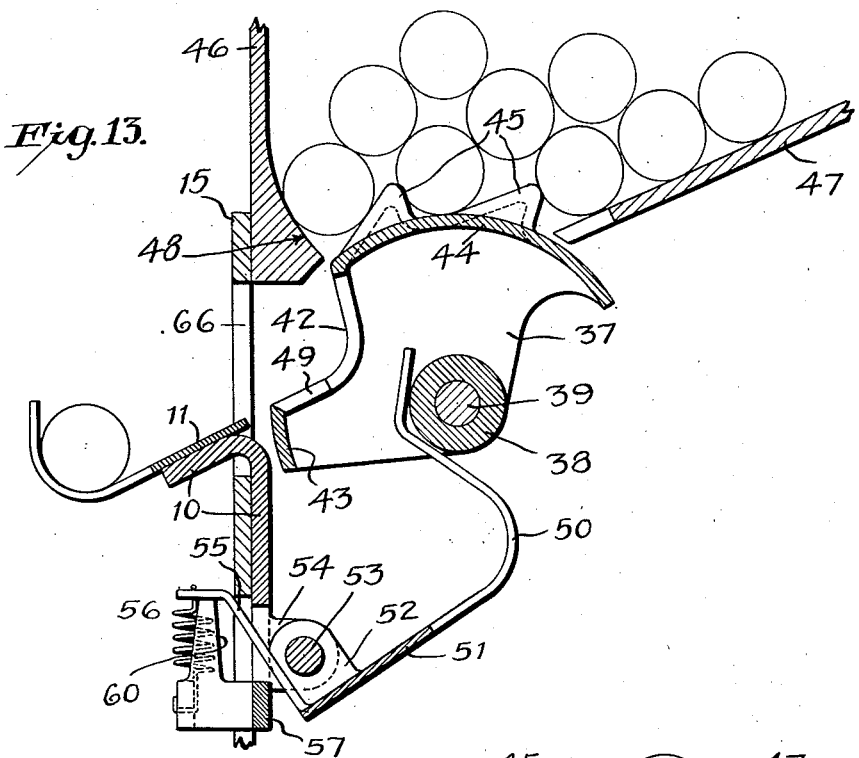
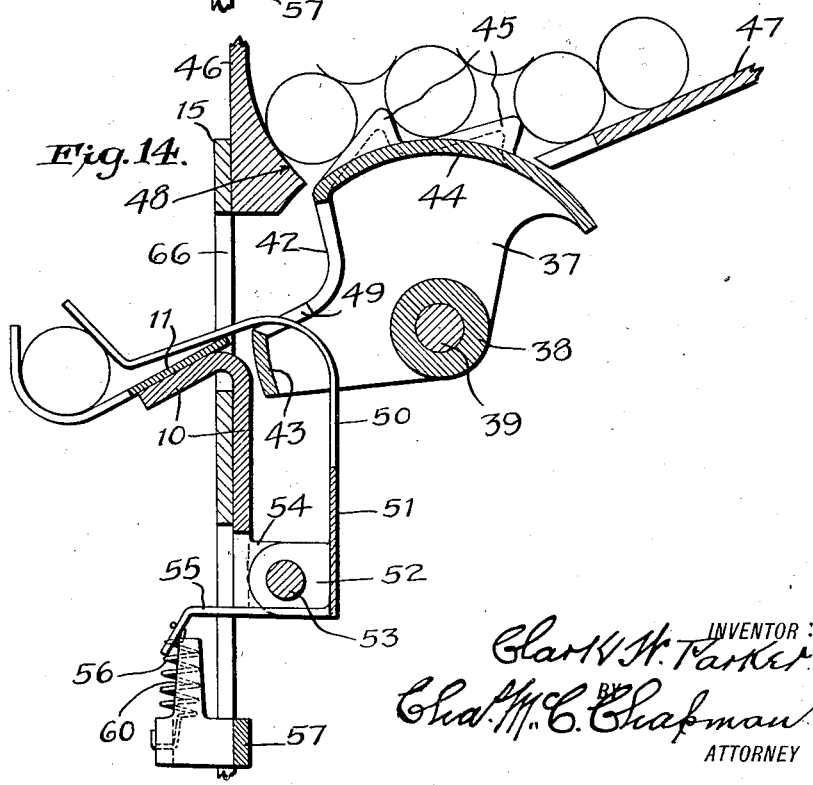

Patented Mar. 21, 1933

1,902,291

UNITED STATES PATENT OFFICE

CLARK W. PARKER, OF NEW YORK, N. Y., ASSIGNOR, BY MESNE ASSIGNMENTS, TO MAX BERNSTEIN, OF NEW YORK, N. Y.

APPARATUS FOR DELIVERING LIGHTED CIGARETTES AND CIGARS

Application filed June 30, 1927. Serial No. 202,497.

This invention relates to the art of cigar and cigarette lighters, and particularly has reference to an apparatus, of universal application, adaptation and use for lighting cigars and cigarettes and delivering them in lighted condition to the user. Among other uses and adaptations for my invention may be mentioned all moving vehicles; theatre and other public lobbies; store, hotel and other counters; private dwellings, and many other places.

According to my invention, in the instance disclosed in this application, a plurality of cigarettes is disposed in a hopper or receptacle and, upon the movement of a single actuating lever, crank or device, the following operations and functions take place in sequence:

One cigarette at a time is fed or shifted into sight; the cigarette is automatically deposited in a tray, clamped and firmly held in the tray until it is lighted; the tray and clamp, with the cigarette between the two, are then automatically shifted in the direction of the length of the cigarette so as to place one end of the latter in contact with a suction device; a sparking device is then actuated to produce a flame in the region of the end of the cigarette, that is, the end opposite the one in contact with the suction device. Instantaneously, suction is produced through the cigarette from end-to-end, thus causing the cigarette end to be lighted, the suction and lighting continuing momentarily until the feat is thoroughly accomplished; the tray, clamp and cigarette are then shifted reversely so as to free the suction device and at the same time shift a snuffer to extinguish the flame. There are other incidental operations and functions, such as the return of the tray, agitation of the cigarettes within the hopper to prevent the group or supply from massing or bridging within the hopper; reverse movement of the snuffer to extinguish the flame; return of the clamp to normal position; and the exhalation of the suction means to blow out the smoke inhaled while lighting the cigarette. The foregoing operations, main and incidental, are performed in rapid sequence as the result of merely shifting a lever or crank to its limit and releasing the same, the mechanism of the apparatus being so timed as to enable the flame to remain lighted and the suction to continue sufficiently long to effectively light a cigarette or a cigar.

From the foregoing it will be understood that my invention has certain important objects in view, viz.: To produce an apparatus, that is, a cigarette and cigar lighter, which will carry out the necessary operations of shifting cigarettes, for example, into view, one by one, and while in view, each one to be properly lighted; to provide means in the hopper for preventing the cigarettes from massing or bridging and thus preventing the apparatus from missing a delivery; to provide a tray in full view of the operator into which individual cigarettes may be delivered and clamped successively and, while thus clamped, to be effectively lighted; to provide means whereby a clamped cigarette may be positioned to enable suction to be created therethrough from end-to-end and simultaneously lighted; to provide means for so timing the suction and lighting devices as to effectively and perfectly light the cigarette; to provide means for creating a spark, or a plurality or a shower of sparks, and to project them into an inflammable atmosphere or into contact with an inflammable substance utilizable for lighting purposes; to provide an adequate holder, for an inflammable substance, arranged adjacent the tray in which the cigarette is laid so that one end of the cigarette can be infallibly lighted; to provide a timing means which will so control the action of the suction device, the lighter and the snuffer, that the suction and the flame will continue sufficiently long to perfectly light a cigarette, and the flame will then be extinguished, thus avoiding wastage and facilitating successive, similar operations; to provide a compact apparatus for the purposes and functions outlined in the foregoing which may be cheaply manufactured, operated indefinitely, continued in use regardless of location, and adapted for universal application and disposition; and to provide an apparatus such as outlined in the foregoing which is comparatively simple, very strong and durable and absolutely certain in its functional operation.

With the foregoing objects in view and others which will be detailed during the course of this description, my invention consists in the features, elements, and combinations thereof hereinafter described and claimed.

In order that my invention may be clearly understood, I have provided drawings wherein:

Figure 3 is a view of my apparatus with the casing removed, the mechanism being shown in front elevation;

Figure 4 is a view showing the apparatus of Figure 3 in top plan;

Figure 7 is a vertical sectional view substantially on the line 7—7 of Figure 9;

Figure 8 is a horizontal sectional view taken substantially on the irregular line 8—8 of Figure 10;

Figure 11 is a vertical sectional view taken longitudinally of the apparatus and just in rear of the bellows and its actuating means;

Figure 12 is a view similar to Figure 9, the section being taken, however, at the opposite end of the apparatus;

Figure 13 is a view showing in enlarged sectional detail the carrier, tray, clamp, ejector and portion of the hopper, the parts being in position just after a cigarette has been delivered by the ejector;

Figure 14 is a view similar to Figure 13, the parts being shown with a cigarette held by the clamp so as to be shifted to the suction device;

Figure 1:
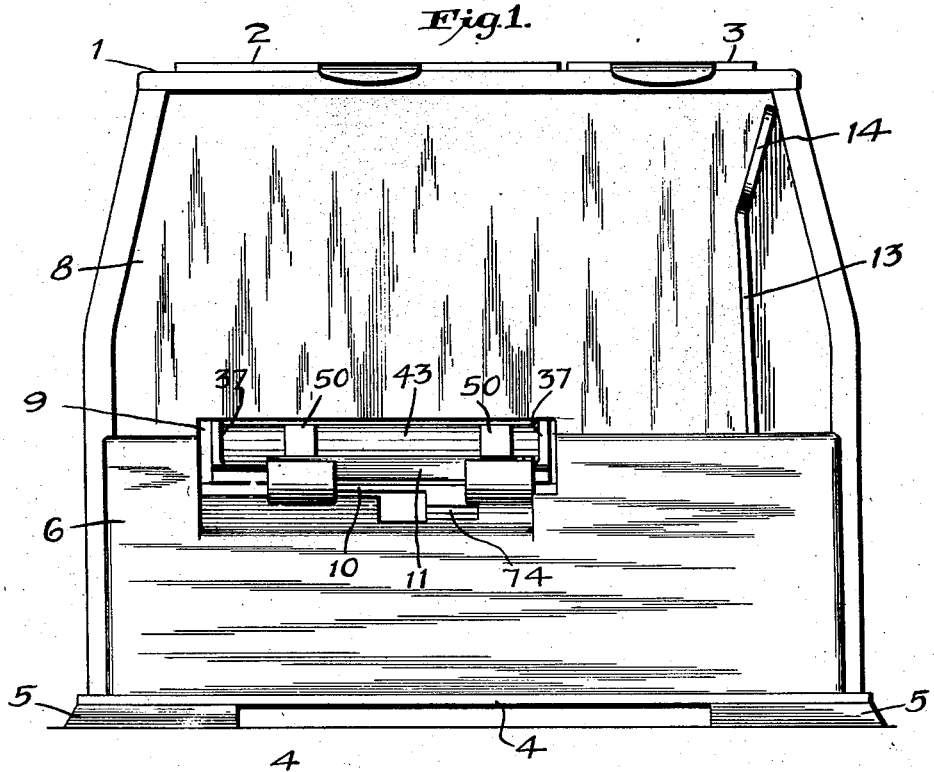
Figure 1 is a view showing my apparatus in front elevation, the working mechanism of which is enclosed within a casing adapted to protect the working parts and the cigarettes contained in the hopper.
Figure 2:
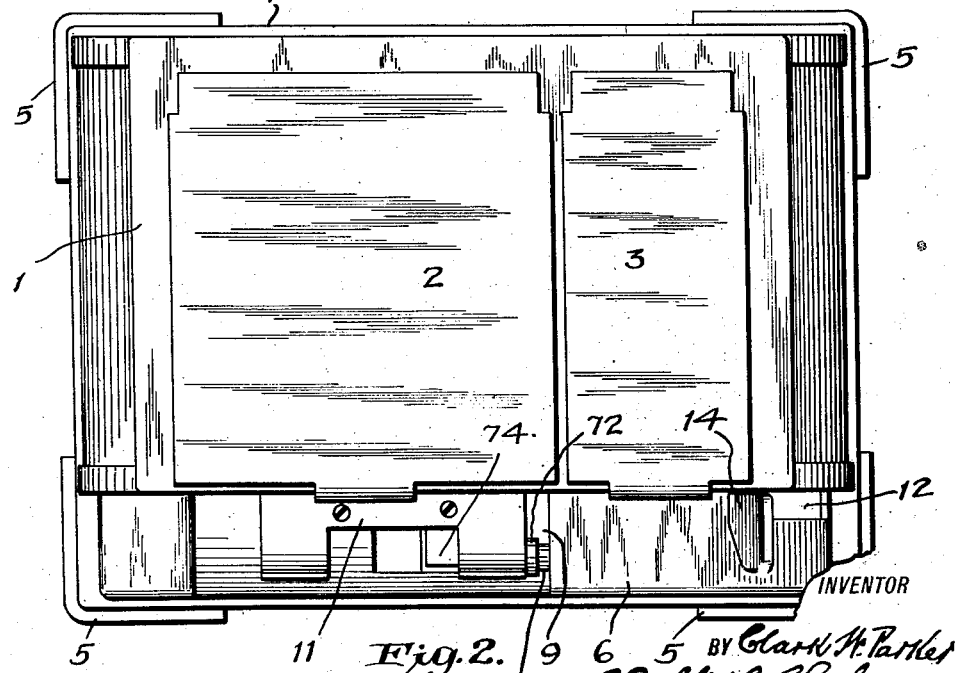
Figure 2 is a view showing the apparatus of Figure 1 in top plan, one corner of the framework being broken away on account of the limitations of the sheet.
Figures 5, 6:
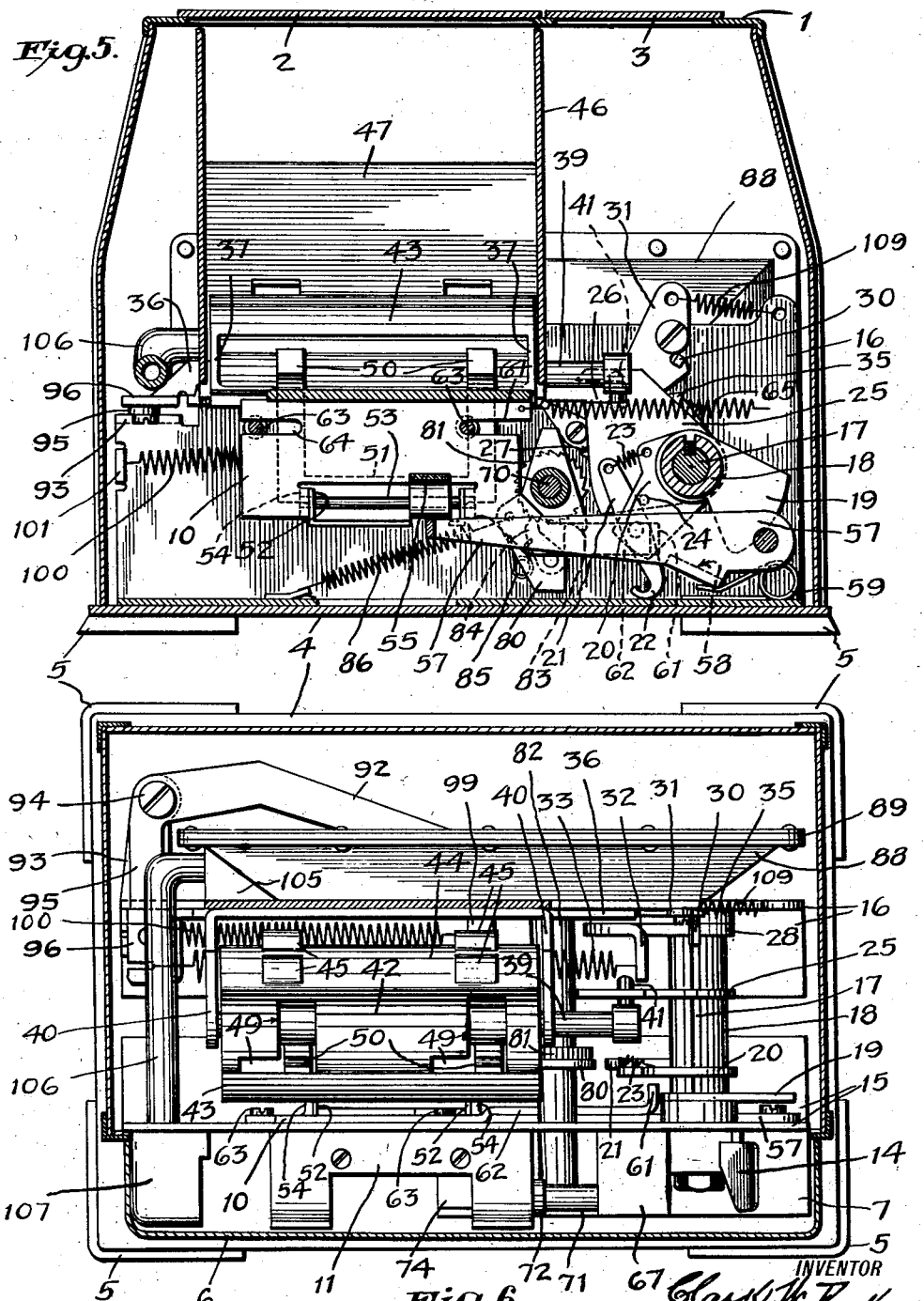
Figure 5 is a vertical sectional view taken on the line 5—5 of Figure 9 and showing details of construction.
Figure 6 is a horizontal sectional view below the top of the casing with the hopper removed.
Figure 9:
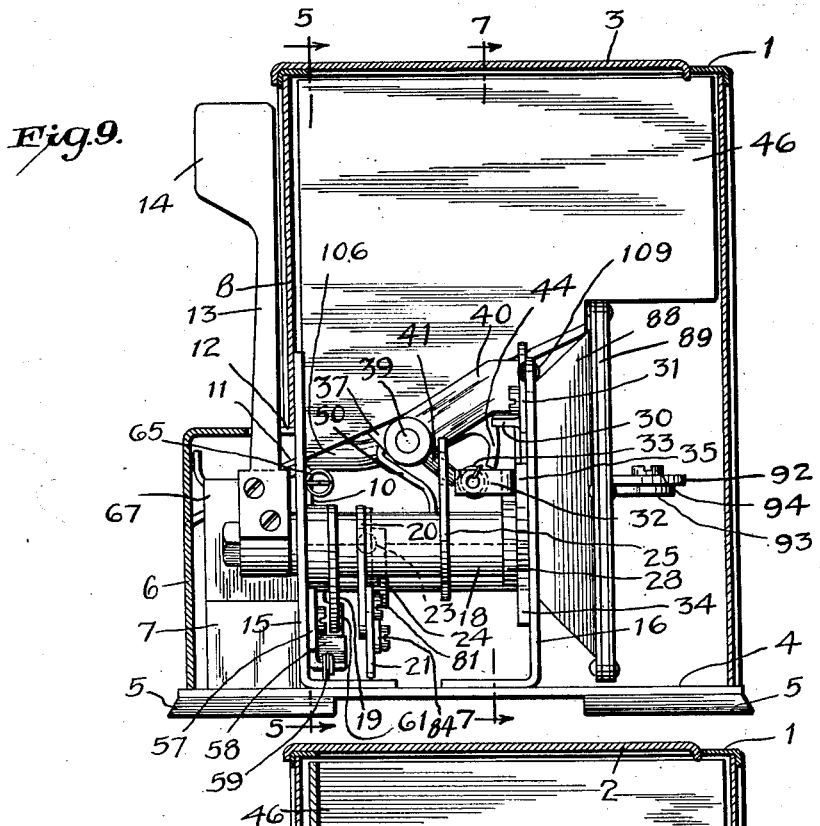
Figure 9 is a vertical sectional view through the casing at the right of the operating lever in Figure 2, the view showing all the parts in end elevation.

Referring to the drawings, and particularly to Figures 1 and 2, it will be seen that the enclosing casing is rectangular in form and is so constructed as to entirely shield the working mechanism of the apparatus. At its top 1, the casing is provided with two openings covered by hinged lids 2 and 3, the larger one of which covers the hopper and the cigarettes contained in the latter and is provided with a finger-piece at its front by which it may be easily lifted and swung upon its hinges. The other lid 3 is considerably smaller and covers a corresponding space within the casing beside the hopper through which considerable of the interior mechanism can be reached and inspected, the lid having also a finger-piece by which it may be lifted and swung upon its hinges. At its base 4, the frame is so constructed as to provide corner supports or rests 5 for the apparatus, and at its front the casing is provided with an extension 6, which covers the reservoir 7 for the inflammable fluid, which reservoir is clearly shown in Figure 3. The front wall 8 of the casing is provided with an opening 9, through which operates the supporting part 10 of the carrier, the clamping fingers, presently described, and within which operates the tray 11 which is supported on the carrier. Through the opening 9, the cigarettes are delivered by the oscillatory ejector clearly shown in Figures 10, 13 and 14. At one end of the front extension, there is a slot 12, through which projects and in which operates the actuating lever 13, which may be provided with an enlarged thumb or finger-piece 14, for ease of manipulation. The enclosing casing is devoid of a bottom plate, the base-plate 4 of the apparatus upon which all the mechanism is mounted taking the place of such bottom, the casing and base-plate being suitably secured together so as to produce the necessary rigidity of the structure. The mechanisms will now be described in sequential order, according to the functions they perform.

*Actuating mechanism.*—The base-plate 4 has two longitudinally extending, parallel, upstanding, supporting plates 15 and 16, see Figures 5 to 8, in which at the right end is mounted a shaft 17, on which are splined spacing sleeves 18 for a number of actuating members. The front end of the shaft 17 is extended through the front plate 15, and has rigidly mounted thereon the operating handle, lever or crank-arm 13, the form of this operating means not being intended as a limitation, since both its position and form and its plane of operation can be modified and changed according to the requirements, simplicity or use of the apparatus. The shaft 17 carries, just in rear of the front plate a clamp-cam 19, which extends rearwardly and downwardly and is in the form, approximately, of a sector, with its lower left angle rounded. Next to the cam, and projecting forwardly and downwardly from the shaft, is an igniter crank or arm 20, which has mounted upon it a lever 21, its fulcrum being substantially midway between its ends, and its lower end being formed into a hook 22, and its upper end being provided with an aperture into which is hooked one end of a coiled spring 23, the opposite end of which is hooked into the aperture of arm 20, the normal tendency of the spring being to shift the lever clockwise and hold it in contact with a stop-pin 24 carried by the arm 20. Next upon the actuating shaft is mounted an ejector-cam 25, having an open-end slot 26, see Figure 5, from the open end of which an eccentric peripheral portion 27 extends operating for a predetermined period upon the ejector. Next upon the actuating shaft is mounted a bellows cam 28, Figures 6, 7 and 8, which extends upwardly and to the left and has a peripheral cam surface 29 acting upon a pin or projection 30 of a triangular stop-plate 31, journaled on the back-plate 16. The cam 28 has a laterally extending lug 32 into which is hooked a strong spring 33 at one end, the opposite end of which is connected to the bellows-lever hereinafter described. Last upon the actuating shaft is mounted a combined pawl-trip and locking cam, the tripping portion 34 of which is in the form of a downwardly extended arm and the cam portion 35 of which operates upon one end of the triangular plate 31 to hold the latter rigidly in position against one end of the slide-bar 36 mounted on the back supporting plate 16 and adapted to slide thereon, as presently described, and which is connected to the bellows actuating lever, the latter being in the form of a bell-crank, as clearly shown in Figure 8 of the drawings.

Figure 10:
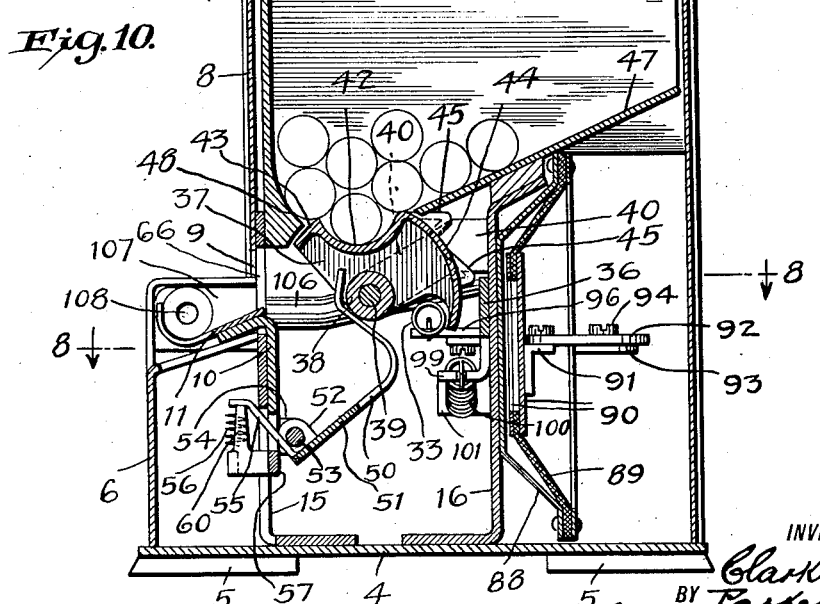
Figure 10 is a vertical sectional view substantially on the line 10—10 of Figure 3, but showing the casing on the apparatus.
Figure 15:
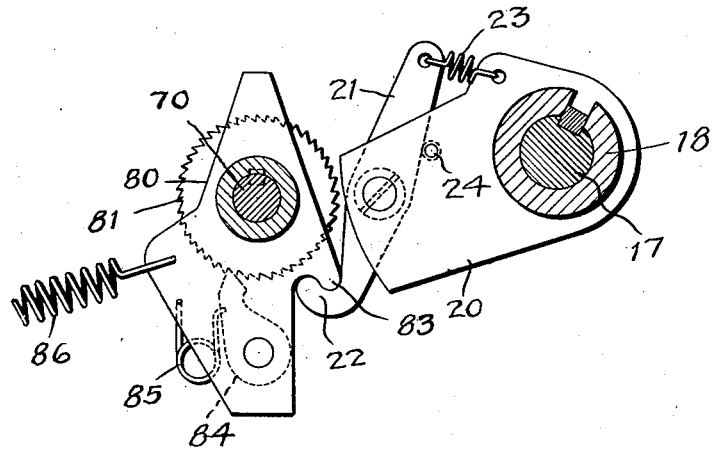
Figure 15 is a view in enlarged detail showing in side elevation the means for actuating the sparking wheel.

*Cigarette ejector.*—When the actuating lever is shifted to turn the actuating shaft, the first thing that happens is the actuation of the cigarette ejector shown in Figures 10, 13 and 14. This ejector is formed from the sector of a hollow cylinder, the opposite ends 37 of which are provided with tubular bearings 38, through which extends a shaft 39 journaled upon the bracket-arms 40 rigidly mounted on the back supporting plate 16. The shaft and journal bearings are splined together or rigidly connected so as to move together and the shaft at its right end is provided with a crank-pin 41 which extends into the slot 26,—Figure 5,—and loosely plays therein, of the cam 25, mounted on the sleeve 18. The ejector, in its periphery, has a longitudinal, hollow portion or cradle 42, between a guard portion 43 and a supporting and considerably elongated convexed portion 44, which has a plurality of radial agitators 45 adapted to act upon the cigarettes in the hopper 46, sustained upon said convexed portion 44 when it is in the position of Figures 13 and 14, at which time it forms the movable bottom of the hopper. The hopper is a rectangular receptacle having an inclined bottom plate 47, an open top covered by the closure 2, and a curved ledge 48 at the bottom of its front wall adjacent the opening in which the ejector operates. The normal position of the ejector is shown in Figure 10, in which position one of the cigarettes will enter and lie in the cradle. The cradle has two angular slots 49 extending transversely thereof near its front edge for a purpose presently described. The ejector, in all positions, forms the movable bottom at the opening in the hopper bottom, and the short guard portion 43 performs the double function of preventing the cigarettes in the hopper from falling out of the latter, viz., descending through the opening in the bottom thereof when in the position of Figure 10, and preventing the cigarette carried in the cradle from falling down into the mechanism of the casing when in the position of Figures 13 and 14. The ledge 48 of the front wall prevents the cigarettes from piling at that point. The portion 27 of the ejector-cam in contact with the crank-pin 41 maintains the ejector in the position of Figures 13 and 14, while other functions of the machine are being performed, and the slotted portion of the ejector cam, operating upon the crank-pin turns the ejector from the Figure 10 position to the Figure 13 position and back again to receive another cigarette in its cradle. When the ejector is oscillated or moved between the positions of Figures 10 and 13, the agitators, of which by preference there are a plurality, operate upon the cigarettes contained in the hopper and prevent them from forming a bridge or assuming massed relation such as to prevent individual cigarettes from dropping into the cradle. Thus, in both its forward and backward movement, the ejector, operating through its agitators, co-operates with the cigarettes in the hopper in such manner as to keep them always loosely related and in condition to readily fall one after the other into the cradle to be ejected into the tray. As shown in Figure 13, the cigarettes will readily roll from the cradle into the tray and especially so since, when the actuating handle is shifted to start the machine in operation, the ejector will be turned in the arc of a circle, counter-clockwise, and will reach its terminal position shown in Figure 13 with something of a jolt, calculated to forcibly eject the cigarette from the cradle into the tray. As will be presently seen, the rest portion of the ejector cam has an important function, since it maintains the ejector in a position shown in Figure 13 during the entire period of reciprocation of the tray and the oscillating movement of the cigarette clamp. The return of the actuating lever to normal position indicates the return of the ejector to normal position, as well as all the other working parts of the apparatus, as will be presently shown.

*Cigarette clamping mechanism.*—After a cigarette has been taken from the hopper and deposited in the tray, it must be clamped therein, gently but firmly and without crushing it, breaking the paper, or unduly compressing it, and this function is accomplished by a pair of resilient clamping arms 50 which, when the ejector reaches the position of Figure 13, are projected through the angular slots 49 in the cradle of the ejector into contact with the cigarette, as shown in Figure 14. The clamping arms may be of suitable form and are carried by, and preferably formed integral with, a plate 51, which has at its opposite ends journal lugs 52 turned at a right-angle to it. Through the lugs passes a supporting shaft 53, or maybe short bearing pins protruding from lugs 54 extending from the tray carrier 10, presently described. Extending forwardly from the bottom edge of the plate 51, which carries the clamping arms is an arm 55, into which is hooked one end of a spring 56, the other end of which is hooked into the left end of a lever 57 journaled on the front supporting plate 15 at its right end, and having adjacent its journal an inclined ledge 58, Figure 5, on which operates the clamp-cam 19. An expansion spring 59 has one extended arm secured to the base of the machine and its other extended arm in contact with the inclined ledge 58 of the clamp lever 57, so as to normally tend to hold the clamp lever in elevated position, thus normally holding the clamping arms in the rearward or inactive position of Figure 10. The free end of the clamp lever is provided with an upstanding member 60, which engages the arm 55 on the plate which carries the clamping arms, the interaction of the arm and member being to prevent the clamping arms from being drawn down into contact with the cigarette so forcibly as to fracture the paper or unduly compress the tobacco. The spring connection between the arm 55 and lever-end constitute a flexible, yielding connection between the clamp lever and the clamp-plate, so that the latter may be shifted laterally with the cigarette, the carrier and the tray when the latter are shifted to cause one end of the cigarette to engage the suction-head presently described. The timing of the parts is such that, after the clamping arms have performed their functions, they will be, at the proper time, quickly released or thrown back from contact with the cigarette so as to not interfere with the return of the ejector to normal position to receive another cigarette in its cradle. Obviously, the cigarette clamping means may be a single clamping member yielding in nature and operating in the same manner described with reference to the two clamping arms, in which event it would only be necessary to make an elongated slot at the edge of the cradle instead of the two angular slots at opposite ends of the cradle. The return of the actuating lever to its normal position means, of course, the return of the clamping arms to their normal position.

*Cigarette tray and carrier.*—After a cigarette has been selected from the hopper by the ejector and rolled down into the tray and clamped therein as previously described, and during the continued downward movement of the actuating lever, the tray 11 and clamp 50 with the cigarette between them are shifted lengthwise of the apparatus. This is accomplished by the contact of the clamp-cam 19 with the angular end 61 of an extension 62 of the carrier plate 10, on which the clamp-plate is journaled, see Figures 5 and 7, and which carrier plate is held to the front supporting plate 15 by means of headed guide pins 63 passing through elongated slots 64 in the carrier plate. Thus the carrier plate and the clamp plate are shifted bodily longitudinally of the apparatus in a right-line toward the left under the impulse of the clamp-cam 19, after passing the inclined lug 58 on the clamp lever 57, this movement of the parts of the carrier and clamp being against the normal pull of a spring 65, secured to the top of the carrier plate 10 at one end and at its other end secured to the front supporting plate 15 near the right end thereof. The tray 11 is rigidly secured to or mounted on the carrier plate 10, which has an angular forwardly extending portion protruding through an elongated slot 66 in the front supporting plate 15, through which slot the clamping arms 50 also operate and through which slot the cigarette is rolled by the ejector. The movement of the tray, carrier and clamps is approximately the distance of the length of the horizontal portion of the slots 49 in the ejector cradle 42, this movement being sufficient to enable the end of the cigarette to be brought into contact with the suction means and into registry axially with the terminal of the suction conduit in the fixed head of the said conduit presently described. The longitudinal movement of the carrier is relatively to the upstanding lug 60, on the clamp actuating lever, see Figures 13 and 14, and relatively to the spring 56 connecting said lever with the extension 55 of the clamp plate, so that as the carrier and clamp plate are moved laterally the connecting spring between the lever and clamp plate is extended or expanded slightly longitudinally and flexed slightly laterally relatively to its seat on the end of the clamp operating lever 57. Thus, the flexible connection between the clamp plate extension and clamp actuating lever is maintained and performs the several functions of holding the two members yieldingly together, permitting the clamp to move relatively to its actuating lever and returning the parts to their normal relative position and relation, upon release of the actuating lever.

*Ignition and cigarette lighting.*—At the front of the apparatus, under the right end of the housing extension 6, adjacent the axis of the actuating lever, the reservoir 7 is located which is in the form of an elongated rectangular or oblong chamber with a vertical extension 67 approximately at its middle,—Figures 3, 4, 6, 8, 9. The bottom of the reservoir is provided with an aperture through which the inflammable substance, such as gasoline, alcohol or other volatile liquid is supplied, the aperture being closed by a screw-plug 68, Figure 3, surrounded by a gasket of any suitable form sufficient for the purpose of sealing the aperture and preventing the escape of the liquid or vapor. The vertical extension of the reservoir is so disposed as to leave a ledge over which is suspended a hardened steel roller 69, the circumference of which is roughened so as to create friction for sparking purposes, as presently described. The roller is mounted upon a shaft 70 and rigidly fixed thereto so as to turn therewith, the shaft being journaled in the two parallel supporting plates 15, 16, the roller being thus held rigidly in position for axial rotation. The vertical extension of the reservoir is provided at its top and left side with a rigidly fixed wick tube 71, the outer end of which is provided with a cylindrical head 72 acting as a stop and seal by metal-to-metal contact with a tubular snuffer 73 carried by an extension 74 of the carriage, directly beneath the right end of the tray. The snuffer is tubular and open at the end which cooperates with the cylindrical head of the wick tube, so that the wick projecting slightly from the free end of the tube will be received within the end of the snuffer which will close snugly upon the cylindrical head of the wick tube and thus shut off all air from the end of the wick, effectively extinguishing the flame by the sealing metal-to-metal contact of the snuffer and wick tube head. Normally, the snuffer is maintained in contact with the wick tube head, as shown in Figures 3 and 4, by the spring 65, which normally holds the tray, carrier and clamp in their right extreme position. Extending laterally and forwardly from the front supporting plate, see Figure 3, are the two parallel arms of a bracket 75 detachably secured to the said front plate. The lower arm 76 is surrounded by a torsional spring 77, one end of which is extended vertically to engage a flint or other ignition means 78, which will create a spark or plurality of sparks upon frictional engagement with the roughened circumference of the steel roller 69. The ignition device is held in the cylindrical socket of the upper arm 79 of the bracket. Thus, the spring normally tends to hold the ignition means pressed against the circumference of the roller, since said ignition means is held loosely in the socket of the bracket. The tangential contact of the flint and steel, or spark making devices, is arranged just below the end of the wick, or within what I term the inflammable atmosphere of the wick end; and the infallible ignition of the wick end is brought about by the clockwise rotation of the steel roller 69, which controls the direction of projection of the spark or cluster of sparks created by the frictional contact of the ignition means. According to my invention, the roller is given approximately a quarter of a revolution in a clockwise direction through the medium of the devices shown in Figures 4, 5, 6, 8 and 9. The ignition actuating means includes the crank-arm 20 and the yielding hooked lever 21 carried thereby, which latter engages an angular plate 80, which is loose on the shaft 70 which carries the ignition roller 69. The angular plate is arranged adjacent the ratchet wheel 81, fixed on the sleeve 82, rotating upon the shaft. The plate has a protruding rounded end 83 adapted to cooperate with the hook of the lever 21, whereby the plate is rotated positively in counter-clockwise direction, carrying with it the pawl 84 pivotally mounted thereon and yieldingly held with its actuating end, by the torsional spring 85, in contact with the teeth of the ratchet wheel 81. As the plate is moved in counter-clockwise direction, a strong coiled expansion spring 86, hooked thereto at one end and to a lug on the base-plate 4 at the other end, is distended thus storing up power. When the hooked end of the lever passes the horizontal plane of the shaft on which the pawl-carrying plate is journaled, it snaps off the protruding end 83 of the pawl plate, thus releasing the latter which will be rapidly returned in clockwise direction to its normal position by the power of the spring, during which movement the pawl, in engagement with the ratchet-wheel, will rotate approximately a quarter turn, this causing the rotation of the steel wheel of the ignition means. While the hooked lever 21 is actuating the pawl plate as previously described, it is slightly swung on its pivot thus expanding the spring 23; and, when the said lever and ratchet-plate snap apart, as just described, the lever is returned by its spring 23 to its normal position against the stop-pin 24 carried by the crank-arm. This yielding connection between the lever and pawl plate is necessary for a quick releasing action in the confined space in which the several parts operate, and to prevent a rigid tie-up between the parts located between the driving shaft 17 and the shaft 81. Thus, the ignition roller is given a very rapid quarter rotation relatively to the yieldingly held flint, under the impulse of the strong spring which returns the pawl plate to its original position. The reservoir is preferably stuffed full of waste, cotton-batten or other absorbent material, which will take up an immense quantity of the inflammable fluid and thus hold the latter both from leakage and evaporation while the apparatus is being handled or operated, regardless of the position in which the apparatus may be held. Prior to filling the reservoir with the inflammable liquid, the wick 87, Figure 3, which may be eight or ten inches long, more or less, is inserted in the wick tube with its main portion extending into the reservoir. The latter is then stuffed with the absorbent material, and the liquid poured therein through the opening in the bottom thereof, after which the plug is inserted as described. The tripping action just described, which causes the quarter rotation of the ignition wheel, takes place approximately at the moment the actuating lever is depressed to its extreme limit, at which time the strong spring 33 connected at one end to the lug 32 on the bellows cam and at the other end to the bellows lever is fully extended, with power stored therein sufficient to not only shift the bellows lever to suck in air, but also to quickly return the actuating lever, through the medium of the sleeve splined to the actuating shaft, to its normal position, it being understood that the said actuating lever is capable of making a little more than a forty-five degree turn from the position shown in Figure 3 to approximately contact with the upper surface of the right end of the reservoir. When the ignition means is tripped into action to throw sparks to create a flame, the tray will have reached its extreme of movement so as to place the cigarette end in firm contact with the end of the conduit through which suction is created.

Figure 16:
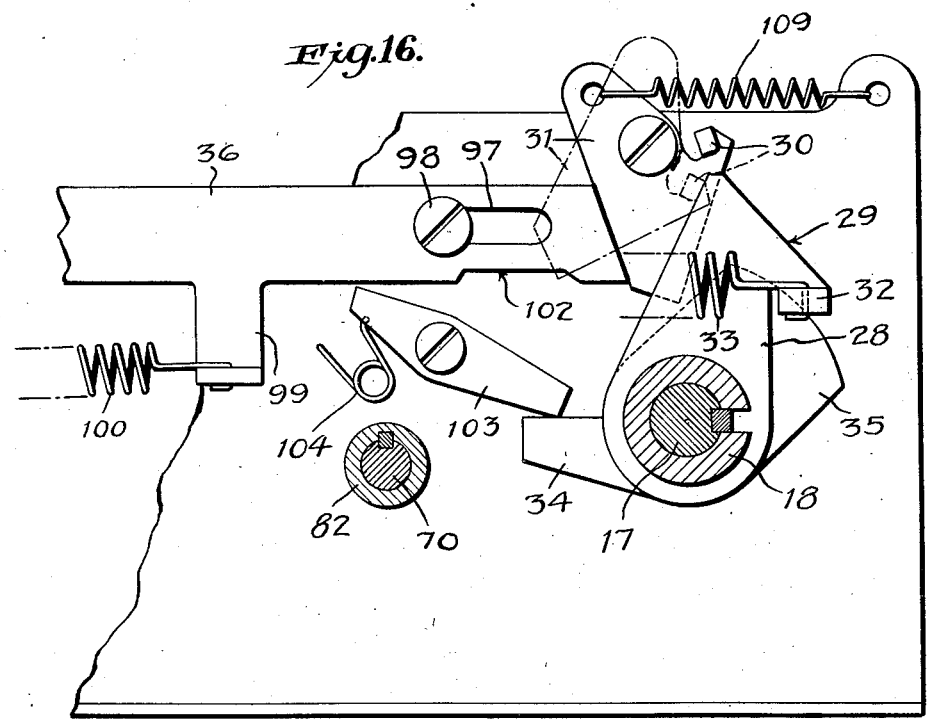
Figure 16 is a view showing in enlarged detail the means for producing the suction action of the apparatus.

*Suction means.*—Secured to the rear of the back supporting plate 16 is a frame 88, shown in Figures 5, 6, 8, 9, 10, 11 and 12, as rectangular in form, trough-shaped and flared around its entire periphery. To this hollow frame, at its open side, is suitably clamped a flexible diaphragm 89 of generous dimensons and of airtight, flexible, durable and tenacious material. To the center of the diaphragm is securely fastened to rigid clamp-plate and frame 90 which has a centrally located bracket 91 affording a pivotal connection for one end of the long arm 92 of a bell-crank lever, which extends to an arm 93 forming part of the rear supporting plate 16, on which arm the lever is fulcrumed at its angle 94, the short arm 95 of the lever being extended forwardly into the space behind the bellows frame at the left end thereof. The end of the short arm of the lever has pivotally connected thereto the angular end 96 of the slide bar 36 having at its opposite end an elongated slot 97 through which extends a headed pin 98 into the rear supporting plate, said headed pin holding the slide bar closely against the supporting plate, as clearly shown in Figures 7, 8, 10 and 11. Depending from the lower edge of the slide bar is a lug 99, to which one end of an expansion spring 100 is connected, the opposite end of said spring being connected to a lug 101 rigid with the back supporting plate. Below the slot 97 in the slide bar is an elongated notch 102 into which enters one end of a pawl 103 normally held in the notch by a torsional spring 104, one end of which is connected to the pawl and the other end of which is connected to the back supporting plate in position to normally lift the notch-engaging end of the pawl. The opposite end of the pawl lies in the path of travel of the tripping arm 34 of the actuating shaft, which forms part of the cam 35 operating as a lock for the triangular plate 31 mounted on the back supporting plate. The rear end of the slide bar 36 is inclined for engagement with the locking plate 31. The end of the trough 88 adjacent the fulcrum of the bell-crank lever is provided with an enlargement 105 in the form of a hollow chamber having an outlet to which is connected the tubular conduit 106, which extends forwardly through the front supporting plate 15 at the left end thereof, where it enters the suction head 107 extending from the face of the front supporting plate, said suction head having an aperture 108, Figure 10, in its left surface adjacent the end of the tray, the diameter of which aperture is considerably less than the diameter of a cigarette. The apertured face of the suction head forms an abutment for the end of the cigarette against which the latter is caused to snugly contact so as to enable air to be drawn through the cigarette from end-to-end during approximately the period of the flame. During the downward movement of the actuating lever, the trip-arm 34, on the driving shaft, moves into engagement with the end of the pawl 103 lying in its path, and during this movement the cam surface 29 contacts with the pin 30 protruding from the side of the triangular stop-plate 31, the cam acting upon the said pin so as to swing the triangular plate away from the adjacent, inclined end of the slide bar, which is normally held at its left limit of movement by the tension of the spring 100 connected to the bottom lug 99 thereof, the movement of the said guide-bar being limited by the headed pin 98 passing through its elongated slot, and also by the bellows plate 90 secured to the flexible diaphragm, since the bell-crank lever is connected to the bellows plate and to one end of the guide-bar. Continued movement of the actuating lever causes the trip arm 34 to act upon the pawl 103 to shift it from the notch in the bottom of the guide-bar 36 against the tension of its spring and simultaneously the spring 33, which is more powerful than the guide-bar spring 100, is distended, thus storing up great power therein. Continued movement of the actuating lever causes the periphery of cam 28 to operate upon the pin 30 of the triangular lock-plate 31, thus causing the said plate to turn about its axis and distend and store up power in its spring 109. Soon as the trip arm shifts the pawl sufficiently to release the slide-bar, the bellows spring 33 pulls upon the bell-crank lever, thus swinging the long arm of the latter outwardly and causing the bellows clamp to distend the diaphragm outwardly, and causing air to be sucked through the cigarette, the apertured head, the conduit and into the bellows chamber. This action begins approximately at the moment the cam surface 29 passes the laterally extending pin 30, on the triangular locking plate 31, at which moment cam 35 releases plate 31, and arm 34 trips the pawl 103, releasing the slide bar, and thus allowing the latter to shift longitudinally to the right on its guiding pin to the limit of its elongated slot, Figure 16, full lines, this action of the guide-bar storing up power in the guide-bar spring 100 by distending the latter. As this tripping action takes place, causing the bellows to be expanded for suction purposes, the actuating lever starts to return to its upright normal position during which period the various parts heretofore described start to return to their normal position; but, the guide-bar has, in moving to its right extreme, engaged the depending portion of the locking-plate 31 and the surface of cam 29 has passed beyond the range of the pin on the locking-plate. As the guide-bar 36 shifts to the left, the locking plate 31, turns quickly under the pull of its spring 109, causing its pin 30 to shift in front of the cam 28, and momentarily retard the same, the cam then moving with the plate 31 and bar 36 to original position, as shown by dotted line position of plate 31, Figure 16, and the full line position of the parts in Figure 7. During this period the bellows spring 33 has been extended to its limit, the bell-crank lever has been moved to swing its long arm outwardly to its limit, thus extending the bellows diaphragm to its limit, filling the bellows chamber with air and smoke drawn through the conduits. As the actuating lever returns to its normal position, the guide-bar spring will take control and will aid the bellows spring in returning the diaphragm, diaphragm-plate, bell-crank lever and slide-bar to normal position, thus forcing air from the bellows chamber through the conduit and expelling the smoke from the suction head. The tripping arm 34 will be returned to normal position, thus allowing the pawl spring to force its end upwardly into the notch of the guide-bar, thus holding the latter in its normal position, which will also hold the bell-crank lever rigidly in position so as to hold the bellows collapsed. The triangular locking plate 31 will also be returned to its normal position shown in Figure 7, under the influence of its spring, and the locking cam 35 will assume its locking engagement with the locking plate, thus preventing either the locking plate or the slide-bar from being accidentally shifted to expand the bellows.

*Mode of operation.*—The various mechanisms having been described in detail, the following sequential mode of operation will be readily understood without further description of the specific parts of the various cooperative and interacting devices and elements. During the first part of the movement of the actuating lever 13, in a clockwise direction, the ejector cam 25 will operate upon the crank arm of the ejector shaft, thus causing the ejector to quickly make approximately a quarter turn to carry a single cigarette from the hopper to the aperture in the front supporting plate so that it may readily roll into the tray mounted on the carrier. Continued movement of the lever a short distance will cause the clamp lever 57 to be depressed at its free end, thus shifting the clamping arms forwardly through the angular apertures in the cradle of the ejector, through the slot in the front supporting plate, and into yielding contact with the cigarette, thus firmly but not destructively clamping the cigarette in its tray. Continued movement of the actuating lever next causes the carrier to shift the tray, clamping arms, cigarette and snuffer simultaneously longitudinally to the left until the cigarette end is firmly in engagement with the apertured wall of the suction head 107 with the axis of the aperture in alignment with the axis of the cigarette, so as to infallibly create uniform suction through the cigarette from end-to-end thereof. When this function has been accomplished, the hooked lever 21 of the ignition crank will immediately snap off the extension 83 of the pawl plate 80, thus releasing the pawl plate and causing it to rapidly rotate under its spring control to cause the pawl to rotate the ratchet a quarter turn, thus turning the ignition wheel rapidly clockwise a quarter turn in contact with the flint or sparking device, the result being that one, or a plurality, or a shower of sparks will be projected into the atmosphere of the inflammable fluid, thus causing the wick to flame directly at the free end of the cigarette. Instantly the flame is produced, the slide-bar pawl will be tripped, thus releasing the slide-bar, the locking cam and plate having in the meantime been moved away from the end of the slide-bar, the movement of the slide-bar being instantly transmitted to the bell-crank lever which will shift the diaphragm and plate outwardly to cause suction through the conduit from the bellows to the suction head and endwise through the cigarette, thus lighting the latter. This suction and lighting action continues momentarily, whereupon the parts will return to their normal position; that is to say, the tray, carrier, cigarette and snuffer are held in their extreme left position with the cigarette end in contact with the suction head, the parts being so related and timed as to enable the bellows to draw air through the cigarette during the period the latter is held with its end in contact with the suction head. The return of the actuating lever to its normal upright position signalizes the quick return of the tray, clamp, carriage and snuffer to original position, the clamping arms being rotated back to normal position, shown in Figure 10, just as the flame is snuffed. The foregoing action is quickly followed by the return of the ejector to the position of Figure 10, during which its agitators, as shown in Figures 13 and 14, will act upon the mass of cigarettes in the hopper resulting in breaking any bridge which may have been formed in the hopper and shifting the mass in such wise as to cause but a single cigarette to drop into the cradle as the ejector reaches the position of Figure 10. While the carriage, tray and clamps are being shifted simultaneously in a right-line to normal position, the slide-bar will be shifted to its normal position from that shown in Figure 16 to that shown in Figure 7, this action of the slide-bar shifting the bell-crank and causing the bellows to be collapsed, thus ejecting air and smoke from the bellows chamber.

Certain features of my invention are exceedingly important and upon them I desire to lay stress; but, in so doing, I wish it understood that I believe my entire apparatus is pioneer in its class and type, and that the general combination of elements is radically new in the matter of their modes of operation and functional results, and that prior to my invention no device has been produced capable of performing the several important functions which I have described in attaining the delivery of lighted cigarettes in the manner disclosed herein. The particular form of igniting mechanism is important since, in a finite space, I have arranged the functional elements so that they will project a shower of sparks in a controlled direction into an inflammable atmosphere or into engagement with an inflammable substance. The snuffing device is important, since the fluid necessarily employed is quite volatile and evaporates rapidly, tending to reduce the number of flame productions and shorten the continuity of life and functional operations of the apparatus without replenishment; and by leading the wick with its ignition end to a snuffing head from which it projects to only a small extent, I am able to protect the wick and prevent it from being consumed rapidly. By employing a cylindrical snuffing head co-operative with a hollow snuffer or tube closed at one end, I provide a chamber which has a double function, viz., it provides a space into which the end of the wick may be protruded for snuffing purposes and, at the same time, it provides a sealed chamber, by metal-to-metal contact, between the end of the tube and the snuffing head, in which volatile fluid may vaporize and from which it cannot escape, until the snuffing tube is shifted from the snuffing head, at which time the volatile and inflammable vapor will escape slowly from the tube and create an inflammable atmosphere surrounding the two parts, or within the space between the two parts of the snuffing device, into which a shower of sparks may be projected for ignition purposes. This is quite important and especially the sealing means created by uniform metal-to-metal contact faces.

The resilient clamp is important because, while it is brought firmly into contact with the cigarette in the tray, which is the rigid jaw of the clamp, the clamping fingers are resilient and yielding and can be regulated or made so as to press firmly upon the cigarette and at the same time be prevented from breaking or splitting the paper or wrapper, and from unduly compressing the cigarette to prevent free suction therethrough. The lower jaw of the clamp, which is the tray, may also be resilient.

The ejector is important from the standpoint of its several functions of being able to select and carry a single cigarette to the tray and deposit it gently in the latter, and at the same time have its guard portions prevent the single cigarette from dropping into the mechanism of the apparatus and other cigarettes in the hopper from following the cigarette carried to the tray. Additionally, the agitators of the ejector are important, since they break up mass formation of cigarettes in the hopper, prevent the formation of a bridge of cigarettes within the hopper, and operate to keep them in loose condition within the hopper so that a single cigarette can be selected, shifted, taken from the hopper and delivered to the tray easily and quickly and without in any manner injuring the cigarette.

The suction means is quite important since it provides a device operative, in timed relation to the other parts, to positively, continuously and sufficiently draw air through the cigarette from end-to-end during the entire period from the production of the flame until the latter is extinguished. Thereafter the collapsing of the bellows removes the smoke and foul air in the bellows and from the conduit, and restores the parts to original position for a repetition of the suction action. At this point, I wish to lay stress upon the funcional idea of means of my invention because my apparatus is self-sustained, contains all of its functional mechanisms, and depends in no particular whatever upon any extraneous means for suction or ignition. This is exceedingly important because of the fact that it gives to my apparatus universal application and use. In other words, my apparatus, for its operation and continued operation throughout an indefinite period of long duration, requires neither a supply of air through the medium of any pressure, exhaust or extraneous supply system, nor the supply of extraneous power or means for the creation of its sparks or its flame, or, in other words, to supply or keep supplied its ignition system and means. From the foregoing it can be readily seen that, when once the reservoir is properly packed and filled with inflammable liquid, the flint or other spark-producing means is properly set, and all the parts are arranged for successive action and interaction for the production of the several sequential functions, my apparatus can be put in use and operated and used indefinitely, regardless of where it is placed, regardless of how often it is used, and regardless of the quantity of cigarettes or cigars which are contained in the hopper. It will also be seen that my apparatus is comparatively simple, taking into consideration the many important functional results to be obtained and operations employed for obtaining the results; very compact in its construction; very strong and durable in its structure; and very simple in its mode of operation or actuation, since but a single lever, arm or crank is required and but a short movement thereof is necessary to start the apparatus into operation and carry it through its various functional procedures.

During the course of the foregoing description, I have referred to cigars as well as cigarettes, and in this connection it will be remembered that nowadays many cigars and cheroots are made with both ends open, so that they can be treated and operated upon precisely the same as cigarettes; and, while in some respects my apparatus, according to its size, may not be adapted universally for the treatment, as described, of cigars of all kinds as well as cigarettes, nevertheless, with slight modification my apparatus can be adapted for practically all kinds of smoking media. If it is desired to operate upon cigars having one end tapered, that end can be severed before placing them in the hopper; but, this may not be necessary in the event a cutting device is added to the apparatus adjacent the suction head, so that, as the cigar is shifted toward the suction head, the tapered end can be severed or quickly chopped off by a rapidly operating cutting blade. Or, the tapered end of the cigar could be forced into the suction head in which can be located a cutting blade operating across the aperture, as will be readily understood. However, for both commercial and economical reasons and purposes, I consider it expedient to make my apparatus selective or distinctive; that is to say, an apparatus specially adapted for delivering lighted cigarettes and another apparatus adapted specially for delivering lighted cigars.

Having thus described my invention, what I claim and desire to secure by Letters Patent is:—

1. An apparatus for delivering lighted cigarettes having, in combination, a cigarette holder, a lighting device and a suction device at opposite ends of the holder, and means for shifting said holder longitudinally between the two devices.

2. An apparatus for delivering lighted cigarettes having, in combination, a tray for receiving and shifting a cigarette, an ejector for conveying a single cigarette to the tray, suction means near one end of the tray, means for shifting the tray toward the suction means, and means for producing a flame to light the cigarette.

3. An apparatus for delivering lighted cigarettes having, in combination, a tray for holding a cigarette to be lighted, means for placing a cigarette in the tray, means for shifting the tray longitudinally to lighting position, and means for lighting the cigarette.

4. An apparatus for delivering lighted cigarettes including, in combination, means for holding a cigarette in predetermined position for lighting including a longitudinally shiftable tray, means for producing an inflammable atmosphere at one end of the tray and cigarette, and means for projecting the sparks into said atmosphere.

5. An apparatus for delivering lighted cigarettes including, in combination, means for holding a cigarette in predetermined position for lighting including a longitudinally shiftable tray, means for producing an inflammable atmosphere at one end of the tray and cigarette, means for projecting a spark into said atmosphere to produce a flame, and means at the other end of the cigarette for creating suction through the same.

6. An apparatus for delivering lighted cigarettes including, in combination, means for holding a cigarette in predetermined position for lighting including a longitudinally shiftable tray, means for producing an inflammable atmosphere at one end of the tray and cigarette, means for projecting a spark into said atmosphere to produce a flame, and means for snuffing the flame.

7. An apparatus for delivering lighted cigarettes including a horizontally supported tray for carrying a cigarette to be lighted, means for shifting said tray in the plane of its support and resilient clamping means for holding the cigarette in the tray.

8. An apparatus for delivering lighted cigarettes including a base-plate having all the kinetic elements of the apparatus mounted thereon, including an ejector, a removable covering frame for said elements, and means for securing said cover to the base-plate, said cover having a hopper or magazine for holding the cigarettes, and the hopper having an opening in its bottom covered by said ejector.

9. An apparatus for delivering lighted cigarettes having, in combination, a tray and circularly moving cooperating means for clamping a cigarette in the tray, an ejector for depositing a cigarette in the tray, suction means at one end of the tray, flame-producing means at the other end of the tray, flame-snuffing means, and means for reciprocating the tray and snuffing means between the suction means and the flame, whereby a flame is produced, the cigarette is lighted, and the flame is extinguished.

10. An apparatus for delivering lighted cigarettes comprising a casing having within it a hopper for the cigarettes, an ejector for taking a cigarette from the hopper, a holder for receiving the cigarette from the ejector open to atmosphere, a lighter, and a suction device at opposite ends of the holder also open to atmosphere, and means for shifting the holder with a cigarette between the lighter and suction device, whereby the cigarette is lighted in view of the user.

11. An apparatus for delivering lighted cigarettes including ejector means, a tray for receiving the cigarettes from said means, suction means and lighting means both in proximity to the tray, and means for shifting the tray toward the suction means, and a single actuating shaft carrying the primary actuators for said several means.

12. An apparatus for delivering lighted cigarettes including a hopper having an opening at its bottom, a rotary ejector for normally closing the bottom of the hopper, a tray into which the ejector delivers a cigarette, a clamp for holding the cigarette in the tray, a suction means at one end of the tray, ignition means at the other end of the tray, and means for shifting the tray with the cigarette to the suction means and placing the opposite end of the cigarette in position for lighting.

13. An apparatus for delivering lighted cigarettes, including a circularly moving ejector for delivering cigarettes one-by-one, a tray for receiving the cigarettes from said ejector, and means moving synchronously with the ejector for clamping the cigarette in the tray and momentarily holding the same for functional purposes.

14. An apparatus for delivering lighted cigarettes including means for delivering cigarettes one-by-one, a tray for receiving the cigarettes from said means, suction means at one end of the tray, ignition means at the other end of the tray, means for actuating the tray to place the cigarette in cooperative relation to the suction means, means for producing a flame at the ignition means, and means carried by the tray, when the cigarette is lighted, for snuffing the flame.

CLARK W. PARKER.